United States Patent
Colson

Patent Number: 6,155,149
Date of Patent: Dec. 5, 2000

[54] SAW DEFLECTION SHIELD

[76] Inventor: Ronald Colson, 10812 N. 700 East, Indianapolis, Ind. 46259

[21] Appl. No.: 09/120,359

[22] Filed: Jul. 22, 1998

[51] Int. Cl.$^7$ .................................................. B23D 49/00
[52] U.S. Cl. ................................. 83/13; 30/123; 30/286; 30/392
[58] Field of Search ............................ 30/295, 392, 393, 30/394, 286, 514, 123; 83/478, 99, 13; 227/11; 173/171, DIG. 2; 408/241 R; 409/181, 182

[56] References Cited

U.S. PATENT DOCUMENTS

| | | | |
|---|---|---|---|
| 1,501,020 | 7/1924 | Small | 30/295 X |
| 2,660,974 | 12/1953 | Swain | 30/295 X |
| 3,547,333 | 12/1970 | Helderman | 227/11 |
| 3,727,655 | 4/1973 | Garcher | 30/514 |
| 3,900,949 | 8/1975 | Anzalone . | |
| 4,011,792 | 3/1977 | Davis . | |
| 4,986,371 | 1/1991 | Lowe . | |
| 5,009,012 | 4/1991 | Martinez et al. | 30/394 |
| 5,185,934 | 2/1993 | Tillman | 30/394 X |
| 5,325,597 | 7/1994 | Clifton, Jr. | 30/295 X |
| 5,349,754 | 9/1994 | Wuensch et al. | 30/392 X |
| 5,524,349 | 6/1996 | Dolin | 30/286 X |
| 5,598,636 | 2/1997 | Stolzer | 30/394 |

*Primary Examiner*—Kenneth E. Peterson
*Attorney, Agent, or Firm*—Woodard, Emhardt, Naughton, Moriarty & McNett

[57] ABSTRACT

An air deflection system and method which is specifically designed for use with reciprocating saws of the type widely used for construction projects. Such reciprocating saws are known to produce so much air-borne particulate matter that they can be a hazard to the eyes, head and respiratory system of the user. The air-borne debris also makes it difficult for the user to see the work being cut. The design provides a slip-on cover for air exit ports which has the effect of deflecting air and hence the particulate matter in a direction away from the head of the user. The resulting effect is a safer and more efficient sawing operation which is accomplished with a low-cost and easy to install deflection shield.

15 Claims, 2 Drawing Sheets

SAW DEFLECTION SHIELD

BACKGROUND AND OBJECTS OF THE INVENTION

The present invention is generally related to the portable saw arts and, in particular, to a novel apparatus and method for deflecting particles away from the saw operator.

Various attempts have been made in the art to solve the problem of sawdust or other particles being directed to the saw operator. Such condition poses well-known health problems as well as decreasing work efficiency.

Add-on type boxes or deflectors in the art have typically been costly and cumbersome to install on an existing saw.

Accordingly, it is an object of the invention to set forth a saw air deflector which efficiently directs sawdust and other particulate matter away from the operator.

It is a further object of the invention to demonstrate an air deflector which has a unique design whereby it may be easily installed on an existing saw without complex or costly assembly procedures.

It is a still further object of the invention to demonstrate a saw air deflector which may be economically produced for widespread commercial appeal.

These and other objects and advantages of the present invention will be apparent to those of skill in the art from the description which follows.

PRIOR ART PATENTS AND DESIGNS

During the course of preparing this specification for submission to the U.S. Patent Office, a full search of the prior art was conducted.

The generally related prior art patents are listed as follows:

U.S. Pat. No. 5,046,255 issued for a saw air deflector to Lebreux in 1991.

U.S. Pat. No. 4,675,999 issued for a power tool dust collector to Ito in 1987.

The above prior art designs are generally related to the present invention. However, they have proven to be costly to install and use in practical applications.

In contrast, the present invention may be utilized without the need for separate fasteners and provides an effective countermeasure to the problem of debris dispersal in the reciprocating saw arts.

SUMMARY OF THE INVENTION

The system and method utilizes a flexible slip-on deflector which may be easily applied to reciprocating saws currently in use in the construction and related arts.

The applied deflector is generally of a short, cylindrical shape with an enlarged left end to permit exit cooling air to be deflected so that less air-borne debris is directed at the head of the saw operator.

Thus, a safer and more efficient sawing is achieved by means of a very easy to apply and economical add-on device.

The flexible design permits ease of installation and eliminates the need for costly and cumbersome fastening methods which are required in generally related air deflection systems.

BRIEF DESCRIPTION OF THE DRAWING FIGURES

DESCRIPTION OF A PREFERRED EMBODIMENT

Figure 1:
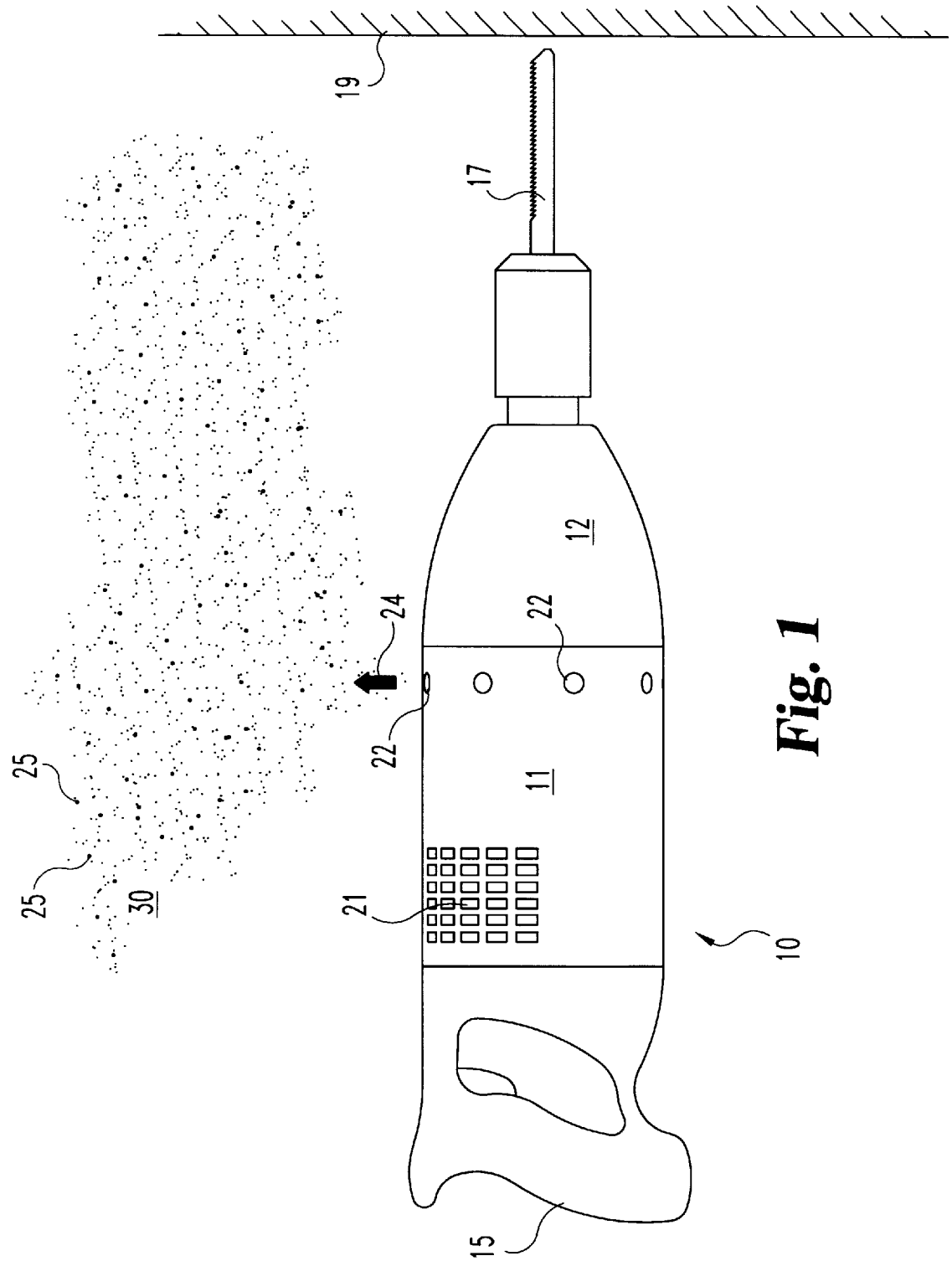
FIG. 1 shows a side view of a reciprocating saw generally used in the art and illustrates the problem of air-borne debris which may pose a hazard and reduce operating efficiency for the saw operator.

As shown in FIG. 1, a reciprocating saw 10 has a motor section 11, a gear box section 12, a handle means 15 and a cutting blade 17 which acts upon work surface 19.

As is known in the art, the saw may further include cooling air entry ports 21 and air exit ports 22.

Exit air from ports 22 flows generally outwardly from the unit and disperses particles 25 from the work surface 19 over a wide area including the head and face of the operator as indicated by numeral 30.

Such wide dispersal of the debris particles 25 obscures visibility for the operator and may cause respiratory and other problems, including injury, for the saw user.

In order to solve the debris dispersal problem, the inventor herein has realized that an air deflector means to redirect exit air 24 would be highly useful in the art. Such would improve efficiency and reduce risk of injury for the operator.

Figure 2:
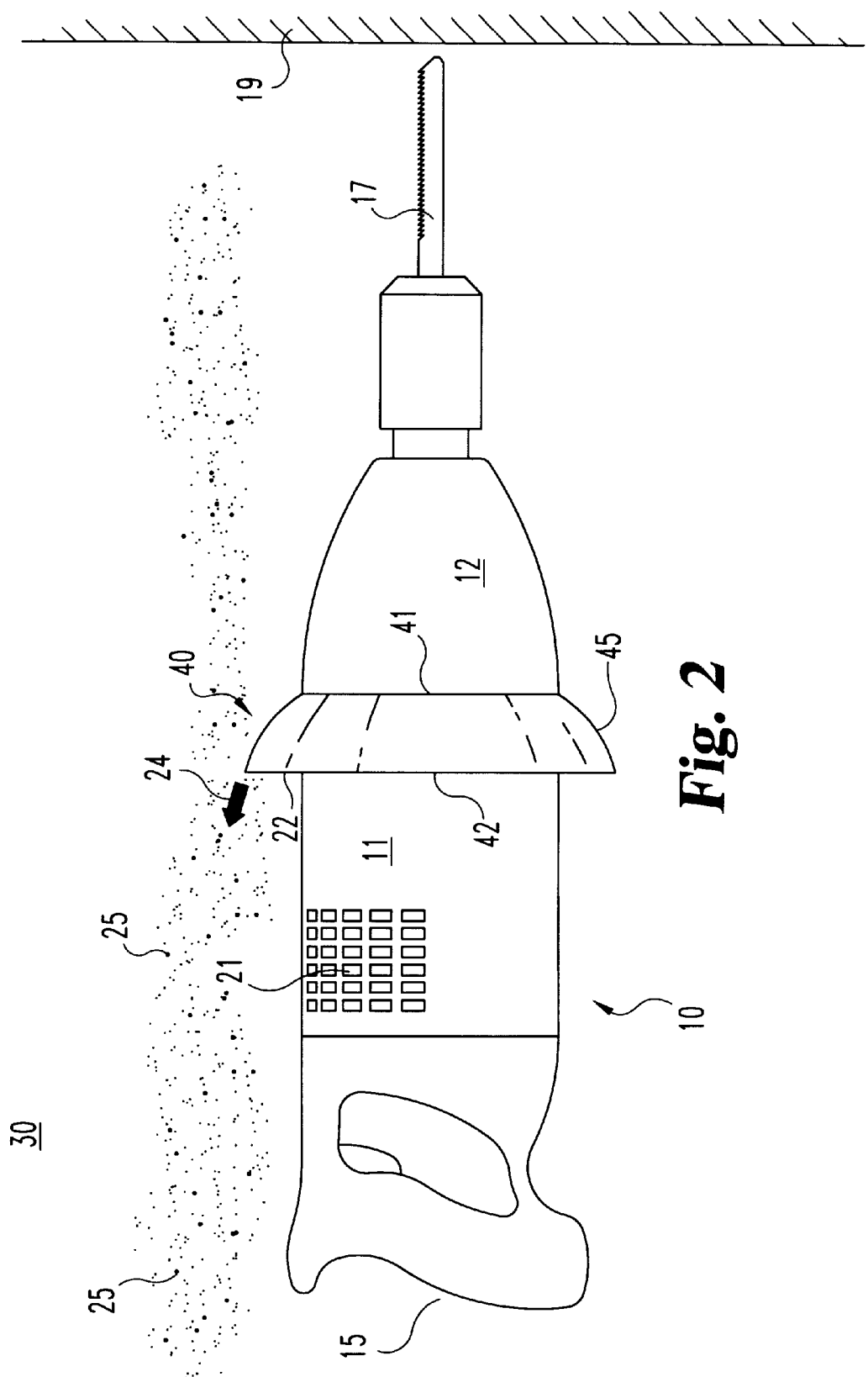
FIG. 2 shows a side schematic view of an applied deflector shield which serves the purpose of directing air and air-borne debris away from the head of the user.

Accordingly, as shown in FIG. 2, an exit air deflector means 40 is added to the reciprocating saw 10.

The deflector 40 has a right side aperture 41 and a left side aperture 42 so that it may be readily slid and pried over the gear box portion of the saw.

The deflector 40 has an outwardly tapered side wall 45 so that, when the deflector 40 is placed at the edge of the air discharge ports, exit air 24 is redirected along the saw toward the handle 15 and away from the head and face 30 of the saw operator.

The deflector 40 is comprised of a flexible rubber material and is sized to fit securely around most reciprocating saws currently used in the art.

Importantly, the flexing nature of the deflector 40 means that it does not require any separate fasteners or connectors to be mounted to the saw. Such feature simplifies the overall design as compared to other deflector systems which require costly and cumbersome attaching means to achieve the desired redirection of air. The principles disclosed may thus have wide application to many mechanical systems.

The deflector design has been tested extensively in practice and found to greatly reduce the problem of debris dispersal, thus helping the saw user and reducing risk of harm or injury.

As noted, the design may be economically produced and sold for widespread commercial appeal and use in the art.

While a particular embodiment has been shown and described, it is intended in this specification to broadly cover all equivalent systems and methods which would reasonably occur to those of skill in the art.

The invention is further defined by the claims appended hereto.

I claim:

1. A method for sawing a workpiece, comprising:
   (a) providing a reciprocating saw having a first end and a second end, said saw having a cutting blade positioned at the first end, and said saw having at least one cooling air entry port and at least two air exit ports on the exterior of said reciprocating saw
   (b) mounting an exit air deflector to exterior of said reciprocating saw at a position between the first end of the saw and the at least two air exit ports and extending over the at least two air exit ports to deflect air exiting from the at least two air exit port toward the second end of said saw; and (c) actuating the saw, thereby causing air to enter the cooling air entry port and to exit the at least two air exit port, thereby providing an air stream directed toward the second end of the saw.

2. The method in accordance with claim 1, wherein said mounting comprises mounting to said saw at a first position substantially adjacent the at least two air exit port and between the at least two air exit port and the first end of said saw an exit air deflector configured such that the deflector and the saw define a passage in fluid communication with the at least two air exit port, the passage extending to a second position between the at least two air exit port and the second end of the saw; and wherein said actuating comprises actuating the saw, thereby causing air to enter the cooling air entry port and to exit the at least two air exit port, thereby providing an air stream entering the passage, which air stream is vented from the passage toward the second end of the saw.

3. An apparatus, comprising:

a reciprocating saw having a first end and a second end, said saw having a cutting blade positioned at the first end, and said saw having at least one cooling air entry port and at least two air exit ports on the exterior of said reciprocating saw, and an exit air deflector mounted to exterior of said reciprocating saw at a position between the first end of the saw and the at least two air exit ports and extending over the at least two air exit ports wherein said deflector is configured to deflect air exiting from the at least two air exit ports toward the second end of said saw.

4. The apparatus in accordance with claim 4, wherein said deflector comprises a flexible material, and wherein said deflector sealingly engages said saw at the first position by the force of friction.

5. The apparatus in accordance with claim 4, wherein said deflector and said saw define a passage in fluid communication with the at least two air exit ports and further define an outlet from the passage, the outlet facing toward the second end of said saw.

6. The apparatus in accordance with claim 5, wherein the outlet is positioned between the air exit port and the second end of said saw.

7. The apparatus in accordance with claim 3, wherein, said deflector defines a first opening configured to sealingly engage said saw at the first position, and a second opening configured to release exit air toward the second end of said saw.

8. The apparatus in accordance with claim 1, wherein the at least two air exit ports are spaced substantially radially about said saw.

9. The apparatus in accordance with claim 8, wherein said deflector is mounted substantially adjacent each air exit port.

10. The apparatus in accordance with claim 4, wherein said deflector is removably mounted to said saw.

11. The apparatus in accordance with claim 4, wherein said deflector is substantially frustoconical, and has an interior surface defining a recess within said deflector.

12. The apparatus in accordance with claim 11, wherein, said deflector defines a first opening configured to sealingly engage said saw at the first position, and a second opening configured to release exit air toward the second end of said saw.

13. The apparatus in accordance with claim 12, wherein the second opening has a perimeter greater than the perimeter of the first opening.

14. The apparatus in accordance with claim 11, wherein said deflector comprises a flexible material, and wherein said deflector sealingly engages said saw at the first position by the force of friction.

15. The apparatus in accordance with claim 14, wherein said deflector comprises a flexible rubber material.

* * * * *